United States Patent [19]

Norris et al.

[11] Patent Number: 4,831,819

[45] Date of Patent: May 23, 1989

[54] ANTI-ICING VALVE

[75] Inventors: Richard M. Norris, Stratford; Kimball J. Rumford, Fairfield; Douglass S. Youd, Shelton, all of Conn.

[73] Assignee: Avco Corporation, Providence, R.I.

[21] Appl. No.: 69,419

[22] Filed: Jul. 2, 1987

[51] Int. Cl.$^4$ ............................................. F02C 7/047
[52] U.S. Cl. ............................... 60/39.093; 244/134 R
[58] Field of Search ..................... 60/39.091, 39.093; 244/134 R, 134 B, 134 F

[56] References Cited

U.S. PATENT DOCUMENTS

| | | |
|---|---|---|
| 2,507,044 | 5/1950 | Palmatier . |
| 2,599,470 | 6/1952 | Meyer ............................... 60/39.093 |
| 2,663,522 | 12/1953 | Lawrence . |
| 2,672,281 | 3/1954 | Redding ............................ 60/39.093 |
| 2,744,992 | 5/1956 | Spears ............................... 60/39.093 |
| 2,747,365 | 5/1956 | Rainbow ............................ 60/39.093 |
| 2,868,483 | 1/1959 | Krueger . |
| 3,057,154 | 10/1962 | Sherlaw et al. . |
| 3,058,305 | 10/1962 | Leigh ................................ 60/39.093 |
| 3,123,283 | 3/1964 | Leis .................................. 60/39.093 |
| 3,258,229 | 7/1966 | Larson . |
| 3,693,916 | 9/1972 | Tritt et al. . |
| 3,720,388 | 3/1973 | Kaatz et al. . |
| 3,891,164 | 6/1975 | Hetrick et al. . |
| 3,981,466 | 9/1976 | Shah . |
| 4,292,502 | 9/1981 | Adams . |
| 4,410,794 | 10/1983 | Williams . |
| 4,470,123 | 9/1984 | Magenheim et al. . |

Primary Examiner—Louis J. Casaregola
Attorney, Agent, or Firm—Perman & Green

[57] ABSTRACT

A unique anti-icing management system for a gas turbine engine is disclosed according to which, at all times, only the required amount of heat is applied to inlet surfaces of the engine to prevent the formation of ice. Heated air is bled from the compressor discharge for this purpose and the amount of flow of the heated air is adjusted by a uniquely operated solenoid valve under the direction of an electronic control responsive to any one of a variety of meaningful conditions including, but not necessarily limited to, temperature of an anti-iced surface at the inlet to the engine, rotational speed of the engine, and the presence of an ice producing meteorological condition. The solenoid valve assumes only two operable positions, namely, a fully open position and a fully closed position, and is operated in a pulsed fashion to control flow on a time basis, rather than on a percentage-of-opening basis which is the conventional mode of operation. A switching operation or mechanism within the electronic control, such as a microprocessor, is responsive to any of the aforementioned conditions to cause the solenoid valve to pulsate according to a predetermined pattern which assures a minimally sufficient flow rate of heated air to the regions to be heated.

13 Claims, 4 Drawing Sheets

ANTI-ICING VALVE

BACKGROUND OF THE INVENTION

1. Field of the Invention

The present invention relates generally to an anti icing management system for a gas turbine engine and, more particularly, to such a system which utilizes a uniquely operated solenoid valve to provide on an as required basis, only the necessary amount of heat to prevent the formation of ice at the engine inlet.

2. Description of the Prior Art

It is common in modern gas turbine powered aircraft to find systems which perform a thermal anti-icing function utilizing hot, compressed gas from the discharge region of the engine compressor called "bleed air." In such aircraft, a portion of the total bleed air available is routed to the various components in the aircraft which are subject to icing and then exhausted overboard.

For purposes of describing the present invention, it will be understood that the term "anti-icing" refers to the prevention of the formation of ice in the first place whereas the term "de-icing" refers to the reduction, or elimination, of ice after it has begun to form. However, it will further be understood that although the term "anti-icing" is consistently used throughout the disclosure, the invention is not to be so limited, but is applicable to de-icing systems as well.

Historically, helicopters have had limited operational capability in icing environments due to their susceptibility to rotor blade icing. Military strategists present numerous scenarios of possible future conflicts involving helicopters in temperate and arctic regions. In these instances, engagement would likely occur in poor weather conditions that are conducive to icing environments, and helicopter mission performance under such conditions could be decisive. Recognizing this fact, the next-generation of smaller helicopters will require all-weather capability and will be equipped with rotor blade deicing systems. As power requirements for rotor blade de-icing are large, research has been directed towards minimizing these requirements using an efficient management control system. However, the need for similar engine anti-icing management systems has been largely overlooked.

High efficiency engines are generally more sensitive to off design operating conditions produced by compressor bleed air anti-icing systems and, without careful bleed air management, can severely penalize engine performance. For example, an advanced technology helicopter turboshaft engine, equipped with an inlet particle separator, requiring 2.5 percent compressor bleed for the critical anti-icing design point, will realize engine performance penalties of 4 to 5 percent SFC (specific fuel consumption) increase, 7.5 to 10 percent power loss, and 40° C. increase in turbine gas temperature These values exceed the power and SFC requirements established by military specifications for anti-icing operation. The cumulative operational effect is a reduction in mission capability and engine life.

Conventional engine anti-icing systems are very wasteful of compressor air bleed heating because operation is set for the most severe anti-icing design point condition even when a less severe or no icing condition is encountered. Preliminary analysis on the accumulative effect of such factors as the probability of encountering icing in clouds, and operating at higher ambient temperatures and engine power conditions than the critical anti-icing design point (e.g. typically −20° C. and flight idle conditions) indicate that only 5 percent of the total bleed energy is being effectively used. Stated another way, when using a conventional engine bleed anti-icing system, 95 percent of the bleed energy can be wasted. Thus, the engine must work harder at higher turbine temperatures resulting in decreased engine life.

To achieve an energy efficient anti-icing bleed management system, it is only necessary to produce sufficient heating to maintain critical inlet surface temperatures above the water freezing temperature when encountering meteorological icing conditions.

Current ice protection systems, particularly anti-icing systems for helicopter engines, however, are not managed for efficient optimization and as a result can adversely impact mission performance and operation. Such systems for helicopter engines, e.g., T53, T55, T58, T64, LT101, and the like, use a compressor hot air bleed source to heat critical engine inlet surfaces. The pilot actuates a simple on/off bleed valve when encountering potential icing conditions, i.e., typically at ambient temperatures below 5° C. in the presence of visible moisture (i.e., a cloud). The bleed valve is designed for a fail safe 'on' condition. This system provides a convenient, dependable heating source in a compact package. However, it is exceedingly energy inefficient.

This inefficiency is due to a number of factors. For example, anti-icing bleed may be actuated by the pilot even when no icing is encountered but merely because the presence of clouds make it appear as being likely to the pilot. Also, excessive bleed energy is consumed when operating above a critical meteorological design anti-icing point, e.g. ambient temperature, $T_o$ equal to −20° C. Still another factor causing the inefficiency is that excessive bleed energy is consumed when operating the engine above a critical anti-icing design point chosen for that particular engine, generally during idle operation. When using a conventional engine bleed anti-icing system, approximately 95 percent of the bleed energy is typically wasted.

Typical of the prior art relating generally to the general field of the present invention is the U.S. Pat. No. 2,868,883 to Krueger which discloses the use of a closed-loop anti-icing system which utilizes heated air extracted from the compressor manifolds of a gas turbine engine. Both the temperature and pressure of air flowing through the wing ducts are monitored. In the event pre-established limits are exceeded, a dump vent may be actuated or the flow of heated air restricted, but in neither instance with any concern for economy of the operation.

More closely allied to the present invention, however, are the U.S. Pat. No. 3,057,154 to Sherlaw et al, U.S. Pat. No. 3,891,229 to Larson, U.S. Pat. No. 3,693,916 to Tritt et al and U.S. Pat. No. 3,258,229 to Hertrick it al. Each of these patents discloses a valve for use in an anti-icing system which is positioned in an air passageway. In each instance the valve can be selectively opened and closed for controlling passage of the fluid therethrough. The latter three patents, in fact, disclose the use of solenoid operated valves.

However, none of the patents is concerned in any manner with economy of operation, that is, with admitting only a minimally sufficient flow of heated air to perform the anti-icing function based on an independent source of pertinent information.

SUMMARY THE INVENTION

It was with knowledge of the state of the art in general and of the foregoing problems in particular that the present system was conceived and has now been reduced to practice. The present invention may be utilized in conjunction with the system disclosed in commonly assigned U.S. patent application Ser. No. 053,254, filed May 22, 1987, entitled "Anti-Icing Management System", the disclosure of which is incorporated herein in its entirety by reference. Thus, the present invention relates to a unique anti icing management system for a gas turbine engine according to which, at all times, only the required amount of heat is applied to inlet surfaces of the engine to prevent the formation of ice. More specifically, heated air is bled from the compressor discharge for this purpose and the amount of flow of the heated air is adjusted by a uniquely operated solenoid valve under the direction of an electronic control responsive to any one of a variety of meaningful conditions including, but not necessarily limited to, temperature at the inlet to the engine, rotational speed of the engine, altitude of the aircraft, and the presence of meteorological icing conditions.

To achieve an effective anti-icing system, it is only necessary to produce sufficient heating to maintain critical inlet surface temperatures above the water freezing temperature when encountering meterological icing conditions. For such an energy efficient solution, a simplified automatic "on demand" system activated by a control in response to a sensed condition and regulated thermostatically is provided.

The heart of the system is a solenoid valve which assumes only two operable positions, namely, a fully open position and a fully closed position. The valve is operated in a pulsed fashion to control flow on a time basis, rather than on a percentage-of-opening basis which is the conventional mode of operation. A switching operation or mechanism within an electronic control such as a microprocessor is responsive to any of the aforementioned conditions to cause the solenoid valve to pulsate according to a predetermined pattern which assures a flow rate of heated air to the regions to be heated sufficient to prevent the formation of ice thereon. The solenoid valve is subject to an infinite number of intermediate adjustments between the fully open and fully closed positions. This ability results in a precise control over the flow of heated air bled from the compressor discharge which allows the realization of numerous benefits compared with current systems. These benefits include: typically, five percent less fuel consumption for missions in icing conditions; enhanced engine power and operational capabilities; and increased engine life.

Other and further features, objects, advantages, and benefits of the invention will become apparent from the following description taken in conjunction with the following drawings. It is to be understood that both the foregoing general description and the following detailed description are exemplary and explanatory but not restrictive of the invention. The accompanying drawings which are incorporated in and constitute a part of this invention, illustrate some of the embodiments of the invention and, together with the description, serve to explain the principles of the invention in general terms. Like numerals refer to like parts throughout the disclosure.

DETAILED DESCRIPTION OF THE PREFERRED EMBODIMENTS

Figure 1:
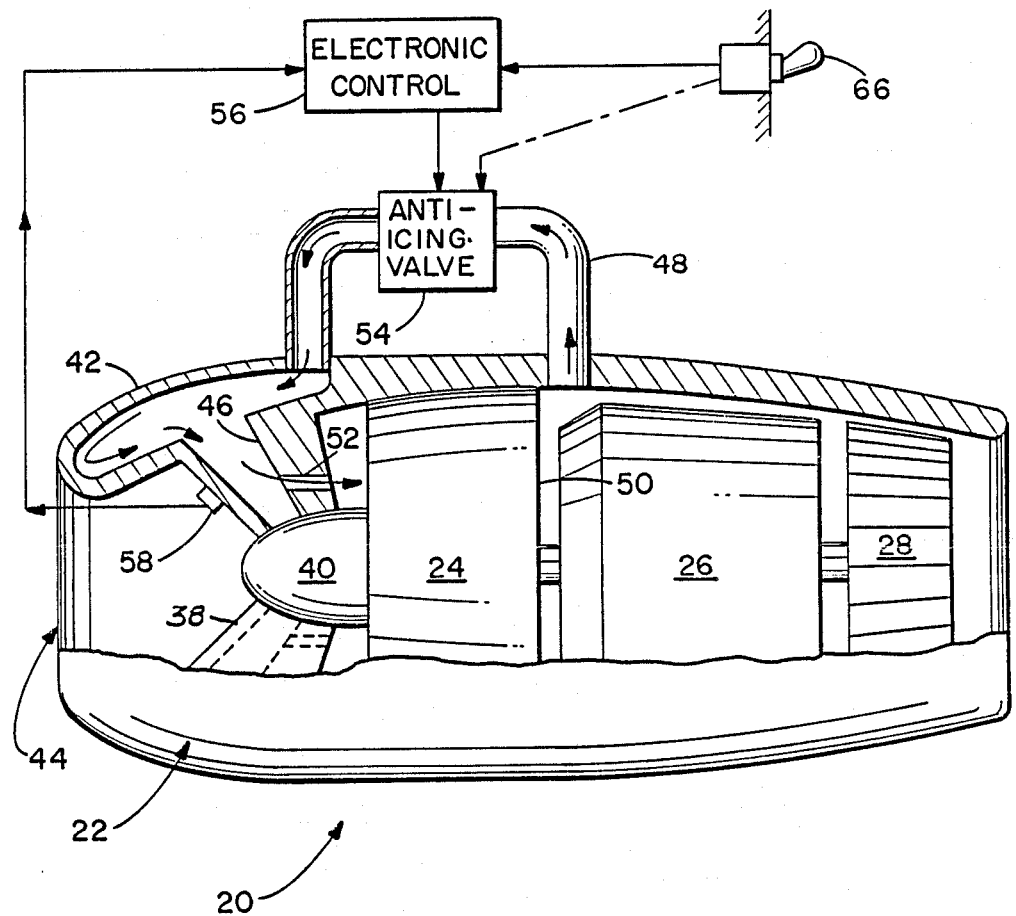
FIG. 1 is a diagrammatic view of an anti-icing management system utilizing a hot air anti-icing valve operated according to the invention.

Turn now to the drawings and, initially, to FIG. 1 which is a diagrammatic representation of an anti-icing management system 20 embodying the invention. The system 20 has application to a gas turbine engine 22, generally of a small to medium size, and of a type normally used to power helicopters. Engines of this class typically handle a mass flow of 10 pounds of air per second or less. In a customary fashion, the gas turbine engine 22 includes a compressor 24, a combustor 26, and an output turbine 28.

Figure 2A:
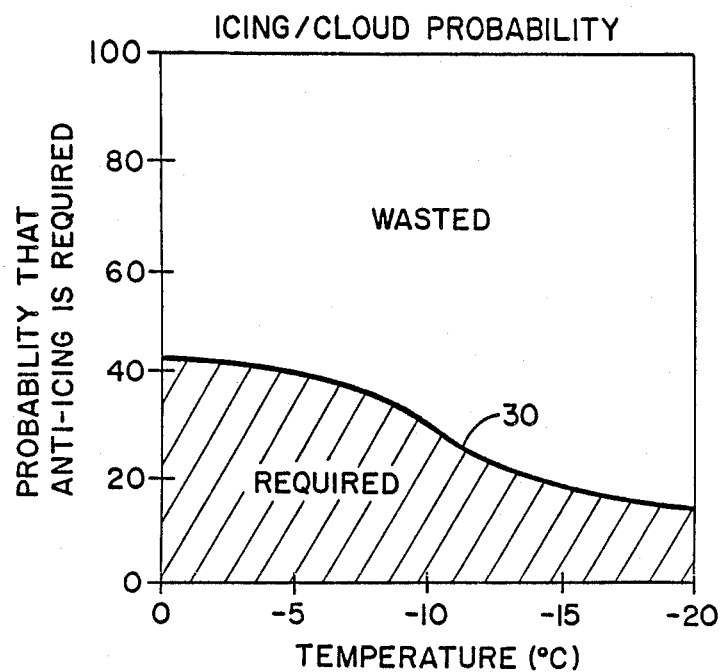
FIGS. 2A, 2B, and 2C are graphs which depict the operations and deficiencies of prior art systems.

It was previously mentioned that conventional anti-icing systems for helicopter engines are exceedingly energy inefficient. Three primary factors were enumerated. A first of these factors is depicted in FIG. 2A and presents the probability that the operation of the anti-icing system is required. As previously explained, the pilot customarily actuates a simple on-off bleed valve when encountering potential icing conditions which occur typically at ambient temperatures below 5° C. in the presence of visible moisture, that is, a cloud. This assessment on the part of a pilot is not always correct and the graph depicted in FIG. 2A indicates the substantial amount of heat which is wasted as a result, specifically that area lying above a curve 30 therein.

Figure 2B:
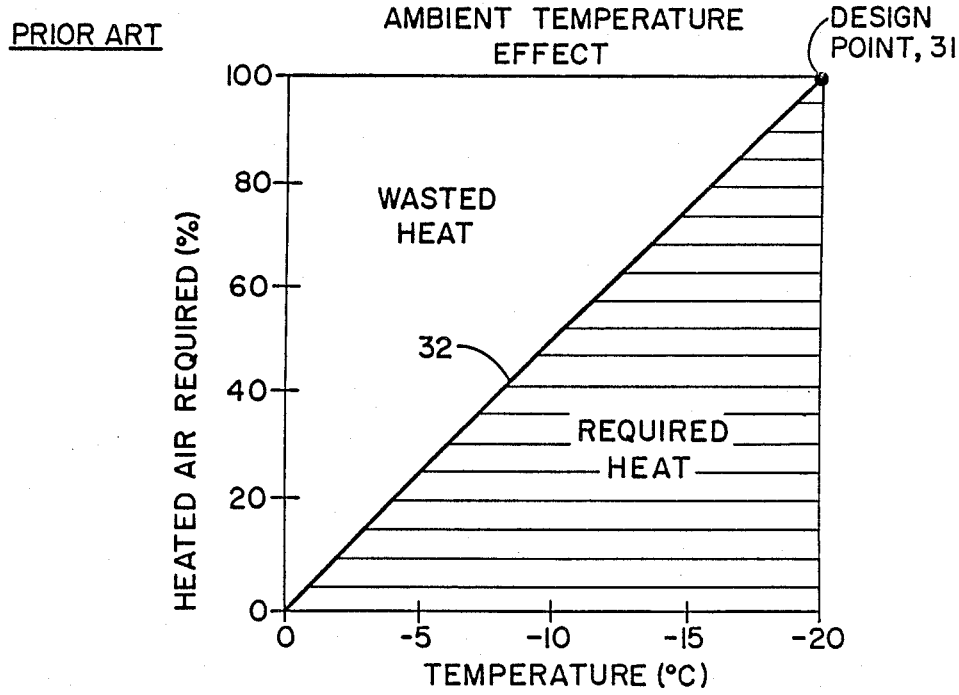

Another of the factors causing inefficiency in conventional on-off anti-icing systems is depicted in FIG. 2B. As seen therein, the engine is designed to assure its proper operation above a critical meteorological design anti-icing point represented by a reference numeral 31. Such a point is arbitrarily, albeit intelligently, chosen, for example, an ambient temperature of minus 20° C. Since there is generally no major concern that icing will occur above 0° C., it will be appreciated that any heat represented as lying above a curve 32 in FIG. 2B will be wasted, that heat represented as lying below the curve 32 being all that is required at any given temperature.

Figure 2C:
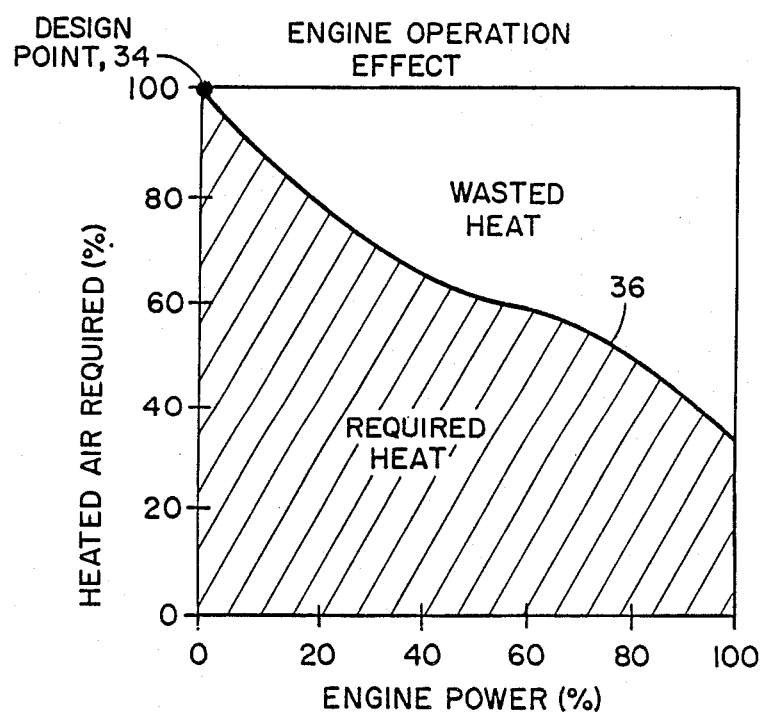

Still another factor causing inefficiency of the type with which the invention is concerned is referred to as the "engine operating effect", and is depicted in FIG. 2C. This means that, for a conventional on-off anti-icing system, excessive bleed energy is consumed when operating an engine above its critical anti-icing design point, which generally occurs during idle operation. A design point, represented by a reference numeral 34, assures that 100 percent of heated air is available for anti-icing purposes when the engine is merely idling. As engine power increases, however, it will be appreciated that bleed temperature increases with the result that the gross amount of bleed air can be reduced while yet achieving the same anti-icing result. However, since conventional anti-icing systems utilized in engines within the size range with which the present invention is concerned, are operated continuously at the design point 34, it will be appreciated, with reference to FIG. 2C, that all quantities of heated air represented as lying above a curve 36 in that graph is wasted and therefore detracts from the performance of the engine.

While systems have been devised to enable operation along the curve 36, they are not readily adaptable to the class of engines with which the invention is concerned without significantly adding to the cost and complexity of the engine. By way of example, the General electric Model T700 is a current, successful, state-of-the-art engine which utilizes such a sophisticated system. Its drawback is that the anti-icing system which it employs is a complex arrangement of mechanical actuators and linkages by means of which the fuel control operates an anti-icing valve to control the flow of anti-icing air. Assembly costs are high as a result, more items are subject to failure, and frequent, time-consuming, maintenance is a necessity.

Table I indicates that the accumulative effect of three factors depicted in FIGS. 2A, 2B, and 2C results in ten percent of the total bleed energy being effectively used when the engine is operating in the idle mode and only four percent of the total bleed energy being effectively used when the engine is in maximum power mode.

TABLE I

CONVENTIONAL ENGINE ANTI-ICING BLEED SYSTEMS ANALYSIS OF MINIMUM BLEED CONSUMPTION FOR EFFECTIVE ANTI-ICING OPERATION

System: - on/off valve, engine compressor bleed heating, fixed bleed geometry
Critical Design Point: - Ambient Temperature −20° C.
Flight Idle Engine Operation

| | | Ambient | Temperatures |
|---|---|---|---|
| | | −5° C. | −20° C. |
| (a) | Probability of encountering icing conditions in clouds* | 40% | 10% |
| (b) | Percent bleed requirement of temperature design point 0° C. - $T_o$ (Actual) 0° C. - $T_o$ (Design) where $T_o$ = ambient temp. | 25% | 100% |

| | | Engine Condition | |
|---|---|---|---|
| | | Flight Idle | Max. Power |
| (c) | Percent bleed requirement of engine condition design point 0° C. - $T_{BL}$ (Design) 0° C. - $T_{BL}$ (Actual) where $T_{BL}$ = bleed air temp. | 100% | 40% |
| | ACCUMULATIVE EFFECT | | |
| | Minimum bleed energy consumption for effective anti-icing (a) × (b) × (c) | 10% | 4% |

*Ottawa NRC Report LR-3344, "Review of Icing Detection for Helicopters", by J. R. Stallabrass, March 1962.

High-efficiency engines are generally more sensitive to off-design operating conditions produced by anti-icing bleed operation. Therefore, engine compressor bleed air for the purpose of anti-icing heating, without proper bleed management, is an inefficient method. Typical performance characteristics for an advanced technology engine indicate that every one percent of compressor discharge bleed air results in penalties which include: a 1.5 to 2.0 percent specific fuel consumption (SFC) increase; a 3.0 to 4.0 percent power loss (for high power limits); and a 1.0 percent increase in turbine temperature (25° C. at high power). Typical anti-icing bleed requirements for a turbo-shaft engine fitted with an inlet particle separator is 2 to 3 percent. Thus, engine performance penalties will be increased proportionally.

Return now, once again, to FIG. 1. The gas turbine engine 22 is provided, in customary fashion, with a pair of inlet struts 38 which support a streamlined centerbody 40 spaced from a forward extremity of an inlet cowling 42 defining an inlet 44 into the gas turbine engine 22. The centerbody 40 is positioned immediately forward of the compressor 24. The inlet struts 38, the centerbody 40, and the inlet cowling 42 define structure located at the inlet of the engine 22 which has surfaces on which ice can undesirably form. The ice can adversely effect the flow of air into the engine and, if it dislodges from the surfaces, would be drawn through the engine and can cause serious damage.

As seen in FIG. 1, the inlet struts 38 and the inlet cowling 42 define air ducting 46 therein for receiving flow therethrough of heated air to thereby prevent the formation of ice on the outer surfaces Although, for purposes of simplicity, the centerbody 40 is not illustrated as being provided with such air ducting, it is within the scope of the invention for the centerbody to be so constructed as well. A passage 48 is suitably provided in the system 20 to direct flow of heated air from a discharge side 50 of the compressor 24 to the air ducting 46 within the structural elements located at the inlet 44 to the gas turbine engine 22. Each inlet strut 38 is provided with an exhaust passage 52 which may exhaust into the compressor 24, or preferably, in some manner, completely away from the engine 22. The exhaust passage 52 assures continuous flow of heated air from the discharge side 50 of the compressor 24, through the passage 48 and then through the air ducting 46.

In this manner, the heated air is continuously supplied to the air ducting 46 so long as a valve 54 in the passage 48 remains open. Pressure differences between the compressor discharge side 50 and the exhaust passage 52 are generally adequate to maintain flow through the passage 48. Although it has been described that the source of heated air is the discharge side 50 of the compressor 24, it will be understood that the heated air can be taken from other suitable locations within the engine 22. For example, compressor interstage bleed air, turbine interstage bleed air, or engine exhaust bleed air would all be appropriate for anti-icing purposes.

As seen in FIG. 1, a hot air anti-icing valve 54 is mounted in the passage 48 to intercept flow of all of a solenoid valve, such as Part No. 53550 manufactured by Sterer Manufacturing Company of Los Angeles, California. The valve 54 is solely operable for movement between a fully opened position, in one instance, to enable maximum flow of heated air through the passage 48 into the air ducting 46, and a fully closed position, in another instance, to prevent any flow therethrough at all. The valve 54 is electrically responsive to a switching mechanism or operation performed by an electronic control 56. The control 56 may be of the type commonly referred to as "FADEC" (Full Authority Digital Engine Control), one suitable control for purposes of the invention being Model EMC-32 manufactured by Chandler-Evans Corporation of Hartford, Conn.

In accordance with the invention, the electronic control 56 is programmed to respond to some meaningful condition which can provide guidance as to whether bleed air is needed for anti-icing purposes and if so, how much bleed air is needed. One such meaningful condition is temperature of the anti-iced surfaces of the engine in the region of the inlet and positioned directly in the path of the incoming air. In this regard, a temperature sensor 58 of any suitable type, such as Model 1122621 manufactured by Lewis Engineering of Naugatuck, Conn. is mounted on the outer surface of one of the struts 38 directly in the path of incoming air. The temperature sensor 58 serves to detect the temperature of the anti-iced surface on which it is mounted and generates a signal proportional thereto. While the sensor 58 is depicted as being mounted on a strut 38, it may just as properly be mounted on the diffuser 40 or, indeed, on any forwardly facing surface directly subject to flow of air through the inlet 44.

Figure 3D:
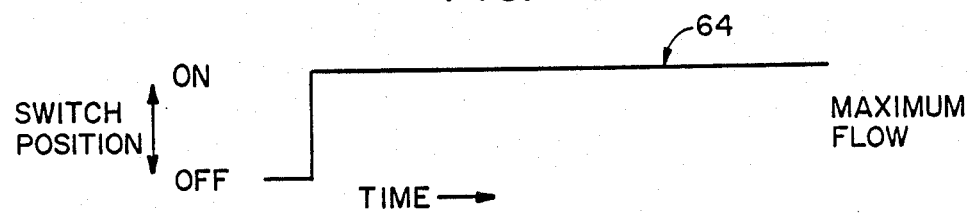
FIGS. 3A, 3B, 3C, and 3D. are graphs which depict the operation of the hot air anti-icing valve according to the invention.

Consider a situation at which the temperature sensor 58 registers and reports to the electronic control 56 that the temperature of a surface within the inlet 44 is less than a predetermined value, typically 0° C. The control 56 determines that flow of heated air to the air ducting 46 is necessary in order to prevent the formation of ice and begins to operate the valve 54. The inactive or fully closed position of the valve 54 is depicted in FIG. 3A at which no flow of heated or bleed air through the passage 48 occurs. With actuation by the control 56, however, the valve is caused to pulsate, that is, rapidly move between the fully open and fully closed positions in a repetition manner. At this temperature (0° C.), however, it is only necessary to provide a generally low flow rate of heated air to the surfaces to be heated. Hence operation of the valve depicted by pulses 60 in FIG. 3B having a relatively small width to pitch (that is, distance between leading edges of adjacent pulses) ratio is sufficient to achieve a low average flow rate as represented by a line 61. This flow rate would be adequate to achieve the amount of heat necessary to prevent the formation of ice on the heated surfaces.

Figure 3C:
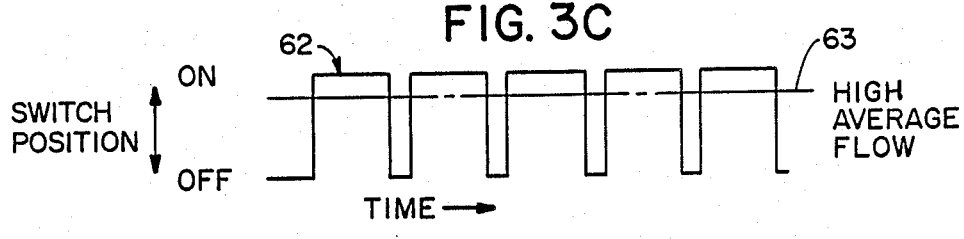
Figure 3B:
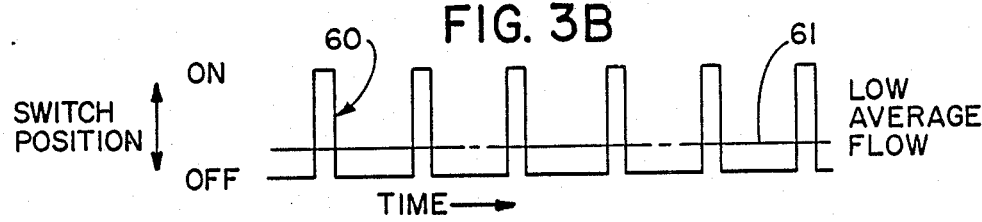
Figure 3A:
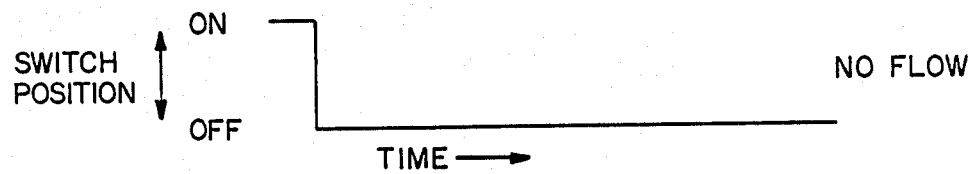

However, if the temperature were moderately colder, for example, $-10°$ C., it might be necessary for the control 56 to operate the valve 54 in the manner depicted in FIG. 3C. In this instance, pulses 62 have a relatively large width to pitch ratio resulting in a relatively high average flow rate of heated air as represented by a line 63. Again, if the control 56 is properly programmed, the amount of heat made available to the surfaces to be protected against ice formation is sufficient for that purpose.

Should the temperature be substantially colder, for example, $-20°$ C., it might be necessary for the control 56 to operate the valve 54 with a pulse 64 of infinite duration, that is, in the fully on position as depicted in FIG. 3D. This mode of operation would continue for so long as necessary to assure maximum flow to the surfaces to be protected and prevent the formation of ice.

It will be appreciated that although operation of the valve 54 may be in terms of cycles per second, the invention is also intended to cover intermittent on/off operation of the valve covering a duration of several seconds or even minutes.

Thus, the operation just described provides an anti-icing system with a valve that monitors the flow of heated air, not according to an area proportional opening as practical by conventional modulated valves but by means of a time proportion, that is, the time interval of a pulse during which the valve is open as compared to the total elapsed time. The valve 54 can be of simplified design, having only two operating positions. At the same time, the flow rate is infinitely variable between no flow operation and maximum flow operation depending upon the instructions transmitted by the control 56.

Figure 4:
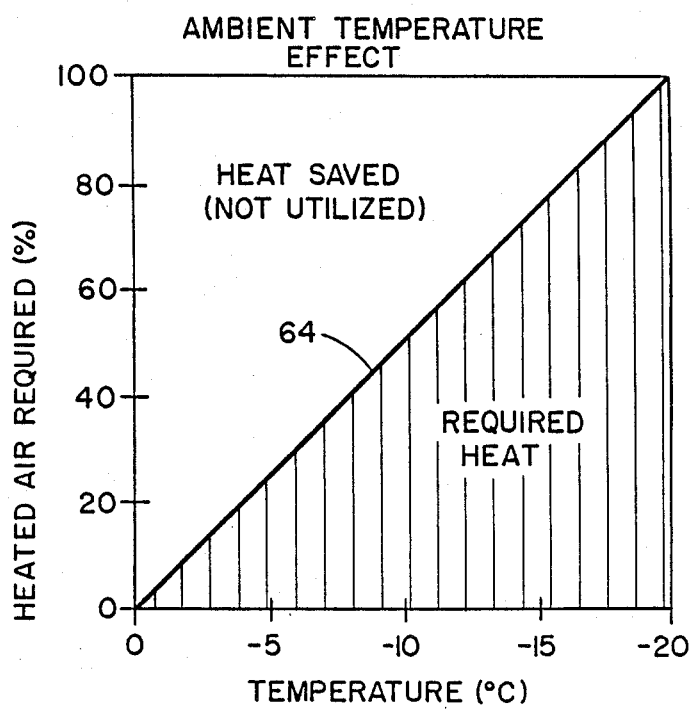
FIG. 4 is a graph which depicts the operation and output of the anti-icing system of FIG. 1.

The effect of managing the flow of heated bleed air to the air ducting 46 by means of the electronic control 56 and pulsed solenoid valve 54 can be readily seen in FIG. 4. Specifically, the average flow rate of heated bleed air is carefully controlled to follow a curve 64. In this manner, only so much heated air as required, and as represented as lying below the curve 64, is directed to the air ducting 48, and no more. Thus, the area above curve 64 in FIG. 4 represents heated air not utilized and therefore saved. The benefits which result from this saving include improved engine performance, decreased fuel consumption, lowered turbine temperatures, and increased engine life.

The operation of the electronic control 56 is also such that in the event of its failure, the valve 54 would remain open in order to assure that there would always be adequate heated air to prevent the formation of ice on the external surfaces at the inlet 44 to the engine 22.

The invention also recognizes that there are times when the pilot of an aircraft into which the system 20 has been incorporated has need to override the system. Thus, as diagrammatically illustrated in FIG. 1, an override switch 66 may be suitably mounted on the instrument panel of the aircraft to enable direct manual operation of the hot air valve 54, moving it as necessary either to its fully open position or to its fully closed position.

Figure 5:
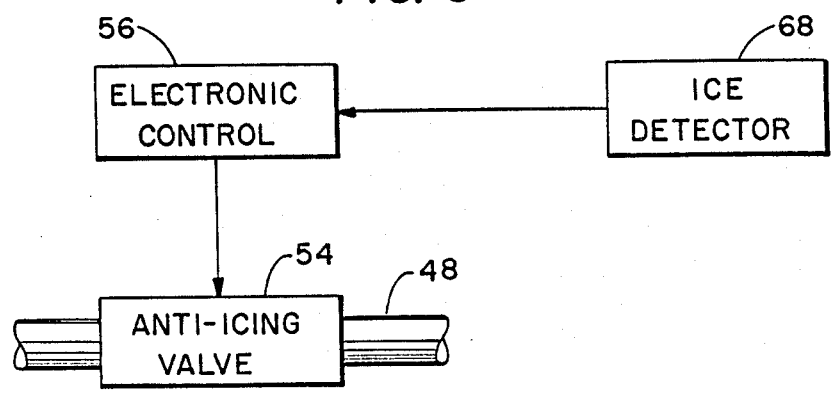
FIG. 5 is a partial diagrammatic view of another embodiment of the system illustrated in FIG. 1.

In another embodiment of the system 20, as seen in FIG. 5, an ice detector 68 may be provided to sense the presence of ice producing conditions. To this end, the ice detector may be located within the inlet 44 to the engine 22 or it may be located elsewhere on the fuselage or on an air foil of the aircraft or at some other appropriate location. An ice detector unit suitable for use with the present invention may be that known as Part Number 126260 manufactured by the Avionics division of Leigh Instruments Limited of Carleton Place, Ontario, Canada.

As utilized in the system 20, the ice detector 68 generates a signal in the event that it senses the presence of an ice producing condition and so informs the electronic control 56. The control 56 then operates the valve 54 in the proper manner without regard to the signal from the temperature sensor 53.

Figure 6:
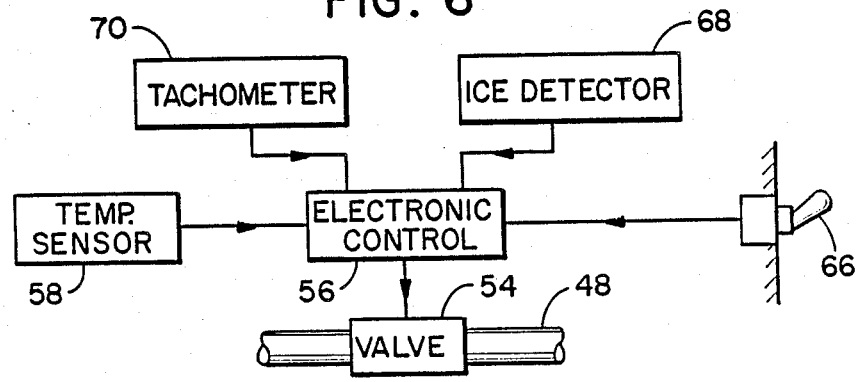
FIG. 6 is a partial diagrammatic view of still another embodiment of the system illustrated in FIG. 1.

Still another embodiment of the system 20 is shown diagrammatically in FIG. 6. In this instance, a suitable tachometer 70 continuously informs the control 52 as to engine speed. It will be appreciated that at higher engine speeds, the bleed air from the compressor discharge is at a higher temperature than at lower speeds. Thus, the same heating effect at the surfaces to be protected against ice formation can be achieved with a reduced mass flow of air.

The electronic control 56 can be programmed to operate the hot air valve 54 in response to the signal from any one of the sensing devices depicted in FIG. 6, or from a sensor (not shown) responsive to some other meaningful condition. The electronic control may also operate the hot air valve 54 according to an intelligent review and evaluation of all the signals received, or of some of the signals received, or of only one of the signals received.

While the preferred embodiments of the invention have been disclosed in detail, it should be understood by those skilled in the art that various modifications may be made to the illustrated embodiments without departing from the scope as described in the specification and defined in the appended claims.

What is claimed is:

1. In a gas turbine engine having inlet surfaces subject to the formation of ice thereon and including a source of heated air, air duct means adjacent to said surfaces for receiving the heated air to prevent the formation of ice thereon, and passage means enabling the flow of heated air from said source to said air duct means, the improvement comprising:
   valve means operable to pulsate between open and closed positions for controlling the flow of heated air through said passage means on a pulse width basis;
   detecting means for sensing at least one existing condition and for generating a signal proportional to the magnitude of each condition so sensed; and
   switching means responsive to the signal from said detecting means for operating said valve means to pulsate over a range of pulse widths according to a predetermined pattern which assures an average flow rate of heated air into said air duct means sufficient to prevent the formation of ice on said inlet surfaces.

2. The improvement as set forth in claim 1 wherein said valve means is a solenoid valve having a closed positions.

3. The improvement as set forth in claim 1 wherein said switching means is a microprocessor.

4. The improvement as set forth in claim 1 wherein said detecting means includes a temperature sensor mounted at a location on said inlet surfaces directly in the path of incoming air for sensing the temperature thereof the operable to generate a signal proportional thereto, said switching means inactive until said temperature sensor senses a temperature at or below a predetermined value.

5. The improvement as set forth in claim 1 wherein said detecting means includes an ice detector for detecting the formation of ice on said inlet surfaces and operable to generate a signal whenever ice is present thereon.

6. The improvement as set forth in claim 1 wherein said detecting means includes:
   tachometer means for measuring the rotational speed of said engine and operable to generate a signal proportional thereto.

7. In an aircraft powered by a gas turbine engine having inlet surfaces subject to the formation of ice thereon and including a source of heated air, air duct means adjacent to said surfaces for receiving the heated air to prevent the formation of ice thereon, and passage means enabling the flow of heated air from said source to said air duct means, the improvement comprising:
   valve means operable to pulsate between open and closed positions to thereby control the flow of heated air through said passage means on a pulse width basis;
   detecting means for sensing at least one existing condition and for generating a signal proportional to the magnitude of each condition so sensed; and
   switching means responsive to the signal from said detecting means for operating said valve means to pulsate over a range of pulse widths according to a predetermined pattern which assures an average flow rate of heated air into said air duct means sufficient to prevent the formation of ice on said inlet surfaces.

8. The improvement as set forth in claim 7 wherein said valve means is a solenoid valve having a fixed amplitude and movable only between the open and closed positions.

9. The improvement as set forth in claim 7 wherein said switching metals is a microprocessor.

10. The improvement as set forth in claim 7 wherein said detecting means includes a temperature sensor mounted at a location on said inlet surfaces directly in the path of incoming air for sensing the temperature thereof and operable to generate a signal proportional thereto, said switching means inactive until said temperature sensor senses a temperature at or below a predetermined value.

11. The improvement as set forth in claim 7 wherein said detecting means includes:
   tachometer means for measuring the rotational speed of said engine and operable to generate a signal proportional thereto.

12. The improvement as set forth in claim 7 wherein said detecting means includes:
   an ice detector located on an external surface of the aircraft for detecting the presence of an ice producing condition and responsive to the presence of an ice producing condition to generate a signal.

13. The improvement as set forth in claim 7 wherein the condition sensed is at least one of the temperature at a location on said inlet surfaces directly in the path of incoming air, presence of ice on an external surface of said aircraft, rotational speed of the engine, and altitude of the aircraft.

* * * * *

UNITED STATES PATENT AND TRADEMARK OFFICE
CERTIFICATE OF CORRECTION

PATENT NO. : 4,831,819

DATED : May 23, 1989

INVENTOR(S) : Norris et al

It is certified that error appears in the above-identified patent and that said Letters Patent is hereby corrected as shown below:

Claim 2, col. 9, line 28, after "a", second occurrence, insert --fixed amplitude and movable only between the open and--;

Claim 9, col. 10, line 24, "metals" should read --means--.

Signed and Sealed this

Sixth Day of February, 1990

Attest:

JEFFREY M. SAMUELS

Attesting Officer     Acting Commissioner of Patents and Trademarks